United States Patent
Wilson et al.

(10) Patent No.: US 6,832,927 B2
(45) Date of Patent: Dec. 21, 2004

(54) LOW PROFILE PCI HOT PLUG ACTUATOR ASSEMBLY

(75) Inventors: Jeremy I. Wilson, Rocklin, CA (US); Christopher G. Malone, Folsom, CA (US); Michael L. Wortman, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/970,194

(22) Filed: Oct. 3, 2001

(65) Prior Publication Data

US 2003/0063454 A1 Apr. 3, 2003

(51) Int. Cl.[7] ............................................... H01R 4/50
(52) U.S. Cl. ..................... 439/347; 200/43.18; 361/801
(58) Field of Search ............................... 439/327, 347, 439/911; 361/740, 759, 801; 200/43.18, 318.1, 322

(56) References Cited

U.S. PATENT DOCUMENTS

| | | | | |
|---|---|---|---|---|
| 5,373,133 | A | * 12/1994 | Brockway et al. | ........... 200/335 |
| 5,642,264 | A | * 6/1997 | Cantrell | ....................... 361/802 |
| 5,989,043 | A | * 11/1999 | Han et al. | .................... 439/157 |
| 6,062,894 | A | 5/2000 | Barringer | |
| 6,127,639 | A | * 10/2000 | Greco et al. | ................ 200/293 |
| 6,162,073 | A | 12/2000 | Haq et al. | |
| 6,182,173 | B1 | 1/2001 | Grosser et al. | |
| 6,189,058 | B1 | 2/2001 | Jones, III et al. | |
| 6,195,259 | B1 | 2/2001 | Whitman et al. | |
| 6,215,673 | B1 | 4/2001 | Gordon et al. | |
| 6,222,708 | B1 | * 4/2001 | Severson et al. | ............... 361/2 |
| 6,232,676 | B1 | 5/2001 | Kozyra et al. | |
| 6,250,932 | B1 | 6/2001 | Smith et al. | |
| 6,252,514 | B1 | 6/2001 | Nolan et al. | |
| 6,269,416 | B1 | 7/2001 | Meier et al. | |
| 6,288,911 | B1 | * 9/2001 | Aoki et al. | .................. 361/801 |
| 6,309,037 | B2 | * 10/2001 | Bertolami | ................ 312/223.2 |
| 6,320,760 | B1 | * 11/2001 | Flamm et al. | ............... 361/801 |
| 6,437,992 | B1 | * 8/2002 | Carney et al. | ............... 361/796 |

* cited by examiner

Primary Examiner—Thanh-Tam Le (57) ABSTRACT

A low profile actuator assembly for controlling PCI card removal from the chassis bay of a hot pluggable computer. The assembly includes a housing, a switch and a latch body. The housing is adapted for mounting to the bay and is defined by a top, bottom, and a front. The switch is coupled to the housing bottom and is operable in a first state and a second state. In this regard, the first state is indicative of a power-on condition, whereas the second state is indicative of a power-off condition. The latch body is connected to the housing and is operatively associated with the switch. More particularly, the latch body is linearly slidably between a retention position and a release position. In the retention position, the latch body is extended relative to the housing front and causes the switch to operate in the first state. Conversely, in the released position, the latch body is retracted relative to the housing front and causes the switch to operate in the second state. In one preferred embodiment, the assembly further includes a push button coupled to the housing adjacent the latch body for prompting a powering down condition.

21 Claims, 6 Drawing Sheets

LOW PROFILE PCI HOT PLUG ACTUATOR ASSEMBLY

BACKGROUND OF THE INVENTION

The present invention relates to an assembly for regulating hot plug removal of PCI cards from a computer system chassis. More particularly, it relates to an assembly adapted to dictate proper slot power conditions during a hot plug operation, and appropriately sized to fit within a computer system chassis affording limited space.

Most modem day computer systems, in particular computer system designed for server applications, include a peripheral component interconnect (PCI) system that interconnects one or more microprocessors with selected PCI cards. The PCI cards are each uniquely designed to support a variety of applications, and afford a user the ability to tailor the computer system for a desired end-use.

PCI-based computer systems are structurally configured to promote manually insertion/removal of the PCI cards. To this end, the computer system includes a chassis maintaining various other components, such as microprocessor(s), power supply unit(s), hard disk drive(s), cooling fan(s), etc. In addition, the chassis forms an I/O card bay defining slots sized to receive PCI cards. The card bay accurately positions and maintains individual PCI cards relative to a connector board (or "backplane") for designated interface with the microprocessor(s), via appropriate PCI bus architecture. In addition, the card bay and/or backplane, to selectively supply power to individual PCI cards following insertion into a particular slot.

A distinct advantage of PCI-based computer systems is the ability to easily remove one or more of the PCI cards for subsequent servicing, exchange, upgrading, etc. As originally conceived, removal of a PCI card from the card bay entailed shutting off power to all of the card bay slots (and thus all of the inserted PCI cards). More recently, however, PCI-based computer systems are designed to allow removal of one or more PCI cards without an entire system shutdown. This feature is commonly referred to as "hot plug" or "hot swap". For high-end applications, especially server applications, this hot plug attribute is essential.

A hot plug operation is relatively straightforward. As a starting point, to facilitate a stable connection to the card bay, as well as appropriate electrical pathways, a metal bracket or bulkhead is attached to at trailing end of the PCI card. Following insertion into the designated slot, the bulkhead is then mechanically secured to the card bay. In many instances, a machine screw is employed to fasten the bulkhead to the card bay frame. During a hot plug operation, then, the user unscrews the machine screw and then removes the PCI card. Prior to actual removal, however, it is preferred that power to the slot in question be shut off. Failure to do so may damage the PCI card being removed, a PCI card that is subsequently inserted into the now vacant slot, and/or other components of the computer system. In this regard, most hot pluggable computer system controllers are programmed to perform a "graceful" shutdown or power down of the slot when prompted by the user (normally via a separate console). As is know, the graceful shutdown preserves the integrity of the PCI card to be removed, as well as other processor functions associated with the slot in question. Less preferably, a "hard" power down operation can be performed by the controller in which power to the slot is shut off, but no sequencing efforts are made to preserve data.

Although proper slot power down is an important aspect of the hot plug procedure, users may inadvertently forget to perform this step. To better assist users in ensuring slot power down, efforts have been made to design and implement PCI card retention/actuator devices that automatically initiate the slot power down procedure when actuated by the user (thereby eliminating a need for user interface with a separate console). The retention device is mounted to the card bay in a manner that requires physical movement of a device component device in order to remove the PCI card in question. Due to the fairly recent conception of this technique, available hot plug PCI card retention devices have been designed for use with new server chassis designs. Thus, any "new" chassis spacing requirements related to implementation of a hot plug retention/actuator device have been addressed by simply sizing the chassis and/or card bay accordingly. As a result, the available hot plug PCI retention and control devices are relatively large and complex, such as that described in U.S. Pat. No. 6,182,173.

While viable for new designs, available hot plug PCI card actuator devices are ill-suited for many existing chassis configurations. For example, a highly popular server configuration incorporates a chassis conforming to a "standard" 7U height. These highly compact servers are commonly employed in "racked" applications, whereby a number of server units are vertically aligned in an appropriately designed rack. A series of these loaded racks are then stored side-by-side in a centralized location. To allow PCI card removal, the chassis positions the card bay at a rear portion thereof, and includes a removable rear panel for accessing the card bay. Because a primary goal of these servers is to minimize, wherever possible, component spacing, only a limited amount of clearance is provided by the chassis between the card bay and the rear panel. As a point of reference, many existing server chassis, such as 7U server chassis, provide a card bay-rear panel spacing of approximately 0.5 inch. Even less space, and often times no space, is available between sides of the card bay and a chassis side panel and/or other internal components. As a result, available hot plug PCI card actuator devices cannot be used with many existing computer system chassis, and in particular 7U chassis.

Most recently available, high-end computer systems, and especially servers, are configured to include PCI card hot plug capabilities. A proper hot plug operation normally requires that the slot in question be powered down prior to card removal. In this regard, efforts have been made to provide an actuator device that ensures the slot power down operation occurs. Unfortunately, no efforts have been made to provide an actuator device that satisfies the spacing constraints of many available server chasses. Therefore, a need exists for a low-profile, PCI hot plug actuator device or assembly useful with both new and existing chasses designs.

SUMMARY OF THE INVENTION

One aspect of the present invention relates to a low profile actuator assembly for controlling PCI card removal from the chassis card bay of a hot pluggable computer. The assembly includes a housing, switch and a latch body. The housing is adapted for mounting to the bay and defines a top, bottom, and a front. The switch is coupled to the housing bottom and is operable in a first state and a second state. In this regard, the first state is indicative of a power-on condition, whereas the second state is indicative of a power-off condition. The latch body is connected to the housing and is operatively associated with the switch. More particularly, the latch body is linearly slidably between a retention position and a release position. In the retention position, the latch body is extended relative to the housing front and causes the switch to operate in the first state. Conversely, in the release position, the latch body is retracted relative to the housing front and causes the switch to operate in the second state. In one preferred embodiment, the assembly further includes a push button coupled to the housing adjacent the latch body. The push button is assembled through an opening in the housing top and is adapted to prompt a powering down condition.

During use, the low profile actuator assembly is mounted to the computer chassis bay such that the latch body and the optical switch are associated with a slot formed by the bay. With the latch body in the release position, a PCI card is inserted into the slot. The latch body is then slid to the retention position, effectively "locking" the PCI card within the slot. Further, the retention position of the latch body allows the switch to operate in the first state, thereby signaling power delivery to the slot. During a hot plug operation, the latch body is slid to the release position, causing the switch to operate in the second state. More particularly, the switch signals powering down of the slot. Further, the latch body is "clear" of the slot such that the PCI card can be physically removed. With the one preferred embodiment, in which the assembly further includes a push button, the hot plug operation preferably includes an operator depressing the push button, the actuation of which prompts a graceful power-down of the slot.

Yet another aspect of the present invention relates to an enclosure device for use with a computer system adapted for hot plug interface with PCI cards. The enclosure device includes a chassis, an input/output card bay, and a low-profile actuator assembly. The chassis defines a height of the computer system, and forms the card bay that otherwise defines a plurality of card slots. The low-profile actuator assembly is mounted to the card bay and includes a housing, a switch, and a latch body. The housing is mounted to a frame of the card bay, and defines a top, a bottom, and a front. The switch is coupled to the housing bottom and is operable in a first state indicative of a power-on condition and a second state indicative of a power-off condition. Finally, the latch body is slidably connected to the housing and is operably associated with the switch. Upon mounting of the housing to the card bay, the latch body is positioned adjacent one of the card slots. Further, the latch body includes a handle and is linearly slidable between a retention position and a release position. In the retention position, the latch body causes the switch to operate in the first state, with the handle extending away from the housing front so as to impede access to the slot. Conversely, in the release position, the latch body causes the switch to operate in the second state, with the handle being retracted toward the housing front, thereby clearing the slot. Thus, during a hot plug operation, the latch body is slid to the release position, thereby allowing access to a PCI card contained within the slot and prompting the switch to signal a power down condition to this slot. In one preferred embodiment, the chassis has a height of 7U, and the card bay is oriented to receive cards through a side of the chassis.

Yet another aspect of the present invention relates to an improved PCI card locator assembly for use with a computer system having card hot plug capabilities. In this regard, the computer system includes a chassis forming a card bay defining a plurality of slots. Further, the PCI card locator includes a housing adapted for mounting to the card bay. With this in mind, the improvement comprises a plurality of switches, a plurality of latch bodies, and circuitry. The plurality of switches are coupled to a bottom of the housing. The plurality of latch bodies are slidably connected to the housing and are operatively associated with respective ones of the switches. Further, the plurality of latch bodies are arranged relative to the housing so as to be operatively associated with respective ones of the slots. The circuitry, in turn, is adapted to operatively associate each of the switches with respective ones of the slots, so that a combination latch body and switch is associated with each slot. In this regard, each of the latch bodies are linearly slidable relative to the housing and the related switch such that in a first position, each latch body impedes removal of a PCI card from the respective slot and causes the switch to operate in a first state. Conversely, in a second position, each latch body is clear of the respective slot and causes the related switch to operate in a second state.

DESCRIPTION OF THE PREFERRED EMBODIMENTS

Figure 1:
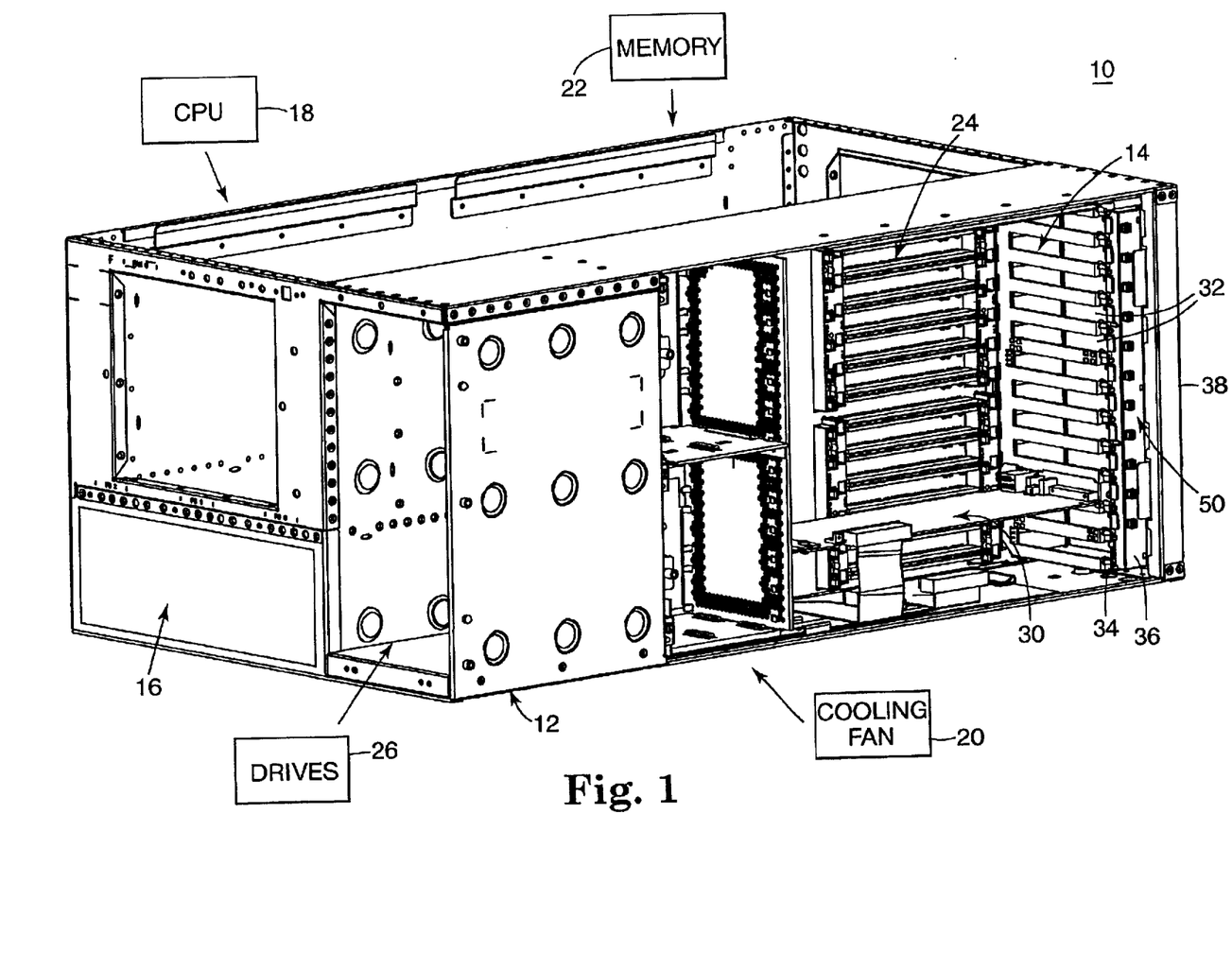
FIG. 1 is a perspective, partially exploded view of a computer system with which the low profile hot plug actuator assembly in accordance with the present invention is useful.

The present invention relates to a low-profile hot plug actuator assembly useful with a computer system, one example of which is shown at 10 in FIG. 1. In general terms, the computer system 10 includes a chassis 12 maintaining a variety of components and forming an input/output card bay 14. The internal components will vary depending upon the particular format of the computer system 10. In a preferred embodiment, however, the computer system 10 is a high-end computer, more preferably a server computer, that includes a power supply unit(s) 16, a central processing unit(s) (CPU) or microprocessor(s) 18, a cooling fan(s) 20, memory 22, a backplane control board 24, and hard drive(s) 26. For ease of illustration, each of the components 16–26 are shown in block form and arrows are provided to indicate generally a location of the particular component 16–26 relative to the chassis 12 in one preferred embodiment. Once again, other configurations, including additional internal components, are equally acceptable for the computer system 10.

Regardless of exact layout, the computer system 10 is a PCI-based system, whereby PCI cards (one of which is shown at 30) are connected to the backplane 24. Thus, the backplane 24 includes appropriate PCI bus architecture. Further, the computer system 10 is configured such that the PCI cards 30 are hot pluggable. More particularly, the card bay 14 defines a plurality of slots 32. The card bay 14 orients the slots 32 such that the PCI cards 30 are properly coupled or "plugged" to the backplane 24 upon insertion. Further, circuitry (not shown) selectively provides power to each of the individual slots 32. As previously described, the PCI hot plug feature of the computer system 10 affords a user the ability to remove one of the PCI cards 30 from the respective slot 32 without requiring powering down or re-booting of the entire computer system 10.

The one preferred computer system 10 illustrated in FIG. 1 is available under the trade designation "L-Class" from Hewlett-Packard of Palo Alto, Calif. In this regard, the chassis 12 associated with the L-Class server is designed as a 7-EIA-unit size. This highly compact design is characterized by a 7U height (approximately 12.25 inches), and minimal, if any, spacing between various components. More particularly, the card bay 14 is located at a side 34 of the chassis 12 (relative to the orientation of FIG. 1, the side 34 is illustrated at a front of the chassis 12 (card bay 14). A side panel (not shown) is secured to the side 34 of the chassis 12 to cover the card bay 14 during use. As a point of reference, the chassis 12 is formed such that a spacing of approximately 0.5 inch exists between the side panel and a leading side 36 (referenced generally in FIG. 1) of the card bay 14 upon final assembly. Further, the card bay 14 is positioned in highly close proximity to a rear 38 (partially hidden in FIG. 1) otherwise defined by the chassis 12. Similarly, other internal components (such as the fans 20) are tightly packed against an opposite side of the card bay 14.

As should be evident from the above, the preferred computer system 10 illustrated in FIG. 1 has only minimal spacing for placement of an auxiliary actuator assembly at the leading side 36 of the card bay 14. Other existing computer systems, especially those incorporating chassis conforming with 7U size requirements, present similar concerns. The present invention overcomes these spacing issues by providing a low-profile hot plug actuator assembly 50 as shown in exploded form in FIG. 2.

Figure 2:
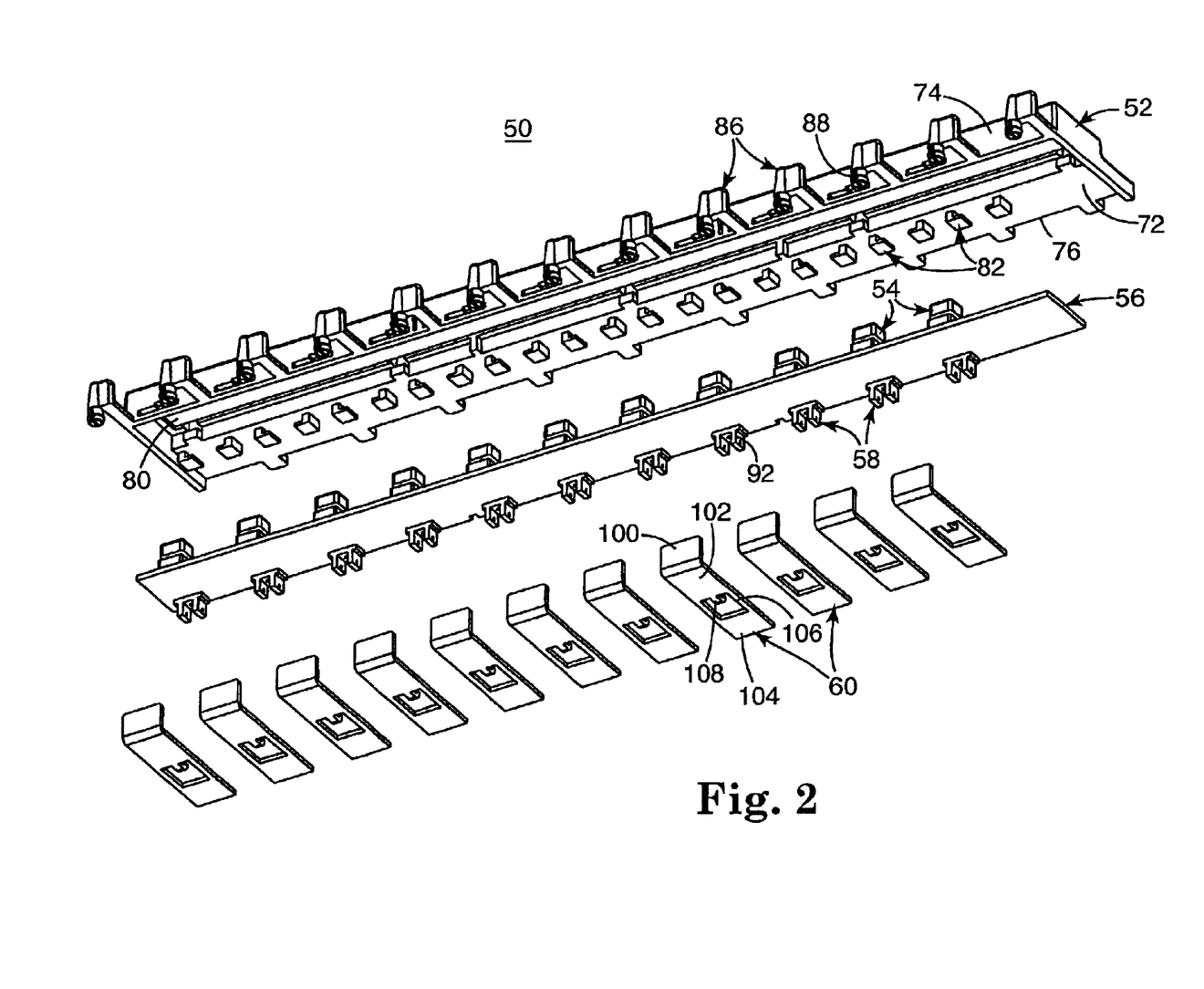
FIG. 2 is an enlarged, exploded view of a low profile hot plug actuator assembly in accordance with the present invention.

In one preferred embodiment, the assembly 50 includes a housing 52, a plurality of push buttons 54, a circuit board 56, a plurality of switches 58, and a plurality of latch bodies 60. As described in greater detail below, the housing 52 maintains the various other components 54–60. The push buttons 54 and the switches 58 are electrically connected to the circuit board 56. In this regard, the push buttons 54 and the switches 58 are spaced along the circuit board 56 at a distance corresponding to a spacing of the slots 32 (FIG. 1) formed by the card bay 14 (FIG. 1). The latch bodies 60 are similarly spaced and otherwise connected to the housing 52. More particularly, the latch bodies 60 are linearly slidably relative to the housing 52 and are operatively associated with the respective ones of the switches 58.

Figure 3A:
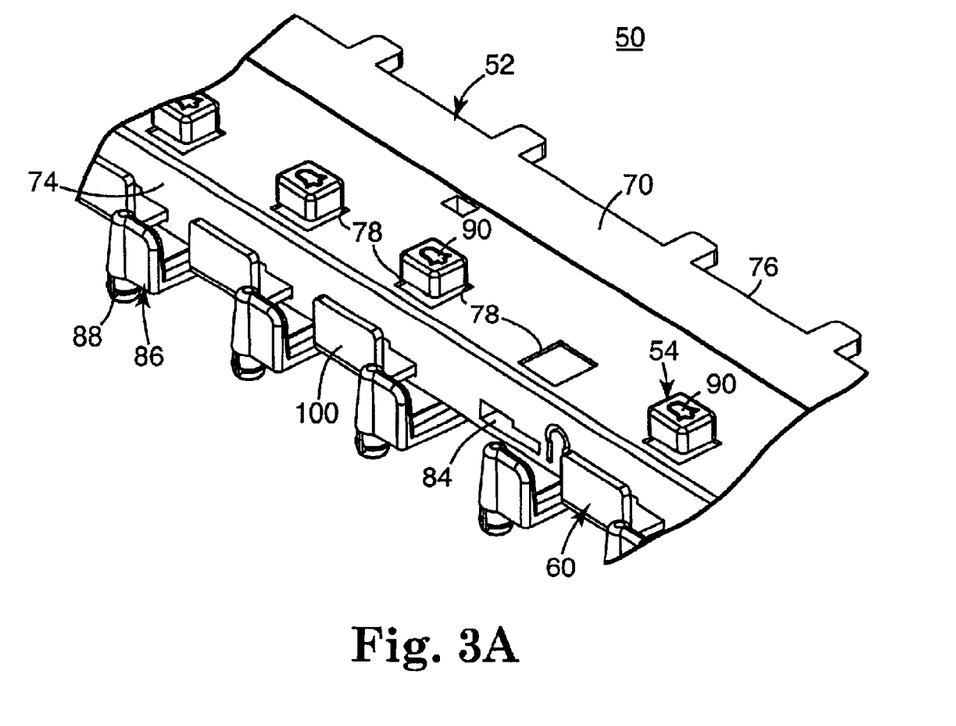
FIG. 3A is an enlarged, top perspective view of a portion of the assembly of FIG. 2.
Figure 3B:
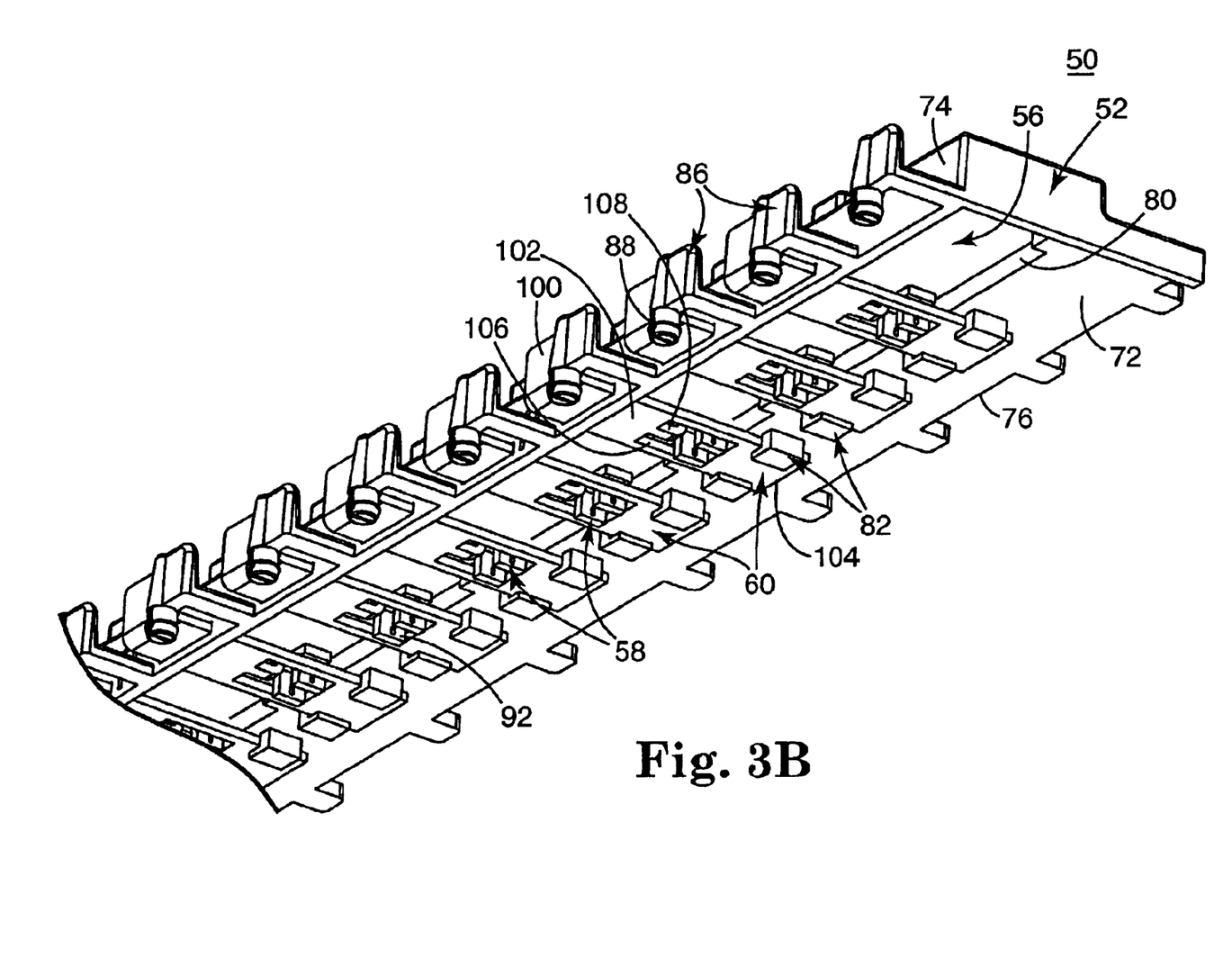
FIG. 3B is a bottom, perspective view of the assembly of FIG. 2.

With additional reference to the assembled views of FIGS. 3A (enlarged, partial top view) and 3B (partial bottom view), the housing 52 is an elongated body defining a top 70, a bottom 72, a front 74, and a back 76. As best shown in FIG. 3A, the top 70 forms a plurality of holes 78 each sized to slidably receive a respective one of the push buttons 54. As best shown in FIG. 2, the bottom 72 forms a cavity 80 sized to receive the circuit board 56. A plurality of tab sets 82 are formed at, and/or extend from, the housing bottom 72. As described in greater detail below, the retention tab sets 82 are sized to slidably maintain a respective one of the latch bodies 60, and are positioned opposite the front 74 of the housing 52.

A further feature is best shown in FIG. 3A, whereby the housing front 74 forms a plurality of passages 84. For ease of illustration, one of the latch bodies 60 has been removed from the view of FIG. 3A to better depict one of the passages 84. Each of the passages 84 are sized to slidably receive a respective one of the latch bodies 60. To this end, and as described in greater detail below, each of the passages 84 are positioned, relative to a corner formed by the bottom 72 and the front 74, so as to provide sufficient spacing between the respective latch body 60 and a PCI card bulkhead component (not shown) upon final chassis mounting. Thus, in one preferred embodiment, each of the passages 84 are positioned at a height of approximately 0.9 millimeter above the corner formed by the bottom 72 and the front 74. In other words, each of the passages 84 are located such that the respective latch body 60 is spaced from the housing bottom 72 a distance of approximately 0.9 millimeters at the housing front 74. Other dimension are also acceptable.

Finally, the housing 52 includes a plurality of guide pieces 86 extending from the front 74. The guide pieces 86 are preferably L-shaped, and are configured for mounting to the card bay 14 (FIG. 1). Thus, in one preferred embodiment, each of the guide pieces 86 forms a retention tip 88 sized for snap-fit placement within a corresponding screw hole (not shown) in the card bay 14, an in particular and L-Class chassis card bay. In this regard, the guide pieces 86 serve not only for mounting the housing 52 to the card bay 14, but also to guide and position PCI cards (not shown) during placement into the card bay 14 (not shown). Of course, for other chassis configurations, the guide pieces 86 may alternatively assume other shapes or sizes, and may be eliminated entirely.

The housing 52 is preferably integrally formed or molded from a plastic material. Alternatively, other non-conductive materials are also acceptable. In addition, the housing 52 can assume a variety of other shapes and/or may incorporate mounting components other than the guide pieces 86 previously described. In general terms, the housing 52 is configured to slidably receive the latch bodies 60, as well as to locate the latch bodies 60 at appropriate intervals for interaction with the slots 32 (FIG. 1) as described in greater detail below. Further, the housing 52 has a low profile (i.e., a preferred maximum height of less than approximately 0.5 inch(12.7 mm) for application with confined chassis designs.

The push buttons 54 are of a type known in the art, and preferably include indicia 90 (FIG. 3A) that visually indicates the activity associated with operation of the push button 54. For example, in one preferred embodiment, the indicia 90 is the commonly-accepted shape of a doorbell feature. Regardless, the push buttons 54 are each electrically connected to the circuit board 56, such as by a contact membrane or switch (not shown). More particularly, assembly of the push buttons 54 is such that upon actuation (e.g., depression), the push buttons 54 prompt the circuit board 56 to perform a designated "graceful" power down operation of a slot in question. The push buttons 54 can, alternatively, assume a wide variety of other forms. Even further, where the graceful powering down of a slot is not a system requirement, the push buttons 54 may be eliminated entirely. Regardless, the push buttons 54 are configured in accordance with the low profile nature of the assembly 50, preferably extending no more than 4 mm above the housing top 70. As a point of reference, the housing top 70 preferably has a thickness of 2 mm, such that a relationship between the housing top 70 preferably has a thickness of 2 mm, such that a relationship between the housing 70 and the push buttons 54 further optimizes the preferred low profile design of the assembly 50.

The switches 58 are preferably optical switches as is known in the art and are electrically connected to the circuit board 56. Further, in one preferred embodiment, the switches 58 are structurally carried by the circuit board 56 as well. Regardless, the switches 58 are configured to operate in a first or second state (i.e., either "on" or "off").

In general terms, and with respect to the one preferred embodiment in which the switches 58 are optical switches, an internal light beam (not shown) is passed through a gap 92 (FIG. 3B) formed by the optical switch 58. When this beam is uninterrupted, the optical switch 58 operates in the "normal" first state (the switch 58 can be either normally off or on). Interruption of the light beam (such as by the latch body 60 as described below) is translated into a switching signal, causing the optical switch 58 to operate in the second state (again, either off or on; opposite of the first state). Alternatively, the switches 58 can be mechanical devices, as is known in the art. Regardless, the circuit board 56, is configured to prompt a defined operational sequence in response to the operational state of the particular switch 58.

As best shown in FIG. 2, each of the latch bodies 60 is defined by a leading end 100, an intermediate portion 102, and a trailing end 104. The intermediate portion 102 is preferably planar and forms an opening 106. With respect to the one preferred embodiment in which the switches 58 are optical switches, the intermediate portion 102 forms a finger 108 that projects in a rearward fashion within the opening 106. As described in greater detail below, the opening 106 is sized for placement about an associated switch 58. Further, the finger 108 fits within the gap 92 of the preferred optical switch 58, thereby serving as a switching mechanism, and preferably terminates in an upward extension (relative to the orientation of FIG. 2). Where the switch 58 is a mechanical-based device (as opposed to the preferred optical switch design), the finger 108 can assume other configurations adapted to interface with, or otherwise "switch" the particular switch design. Even further, depending upon the particular configuration of the switch 58, the finger 108 can be replaced by a different component) and/or removed entirely.

The leading end 100 extends upwardly from the intermediate portion 102 (relative to the orientation of the FIG. 2), preferably perpendicular to the plane defined by the intermediate portion 102. With this configuration, the leading end 100 serves as a handle. So as to provide requisite surface area for grasping by a user, the leading end 100 has a height (relative to the intermediate portion 102) corresponding with space requirements of the particular computer system 10 (FIG. 1). That is to say, the handle formed by the leading end 100 is preferably as large (or tall) as possible without causing interference with other chassis components. Thus, in one preferred embodiment, the leading end 100 extends from the intermediate portion 102 to a height in the range of approximately 9.525–12.7 mm. This one preferred range accounts for spacing requirements of the one preferred computer system 10 (FIG. 1), as well as the location of the latch body 60 relative to the housing 52, and thus of the housing 52 relative to the chassis 12. Alternatively, other dimensions are also acceptable.

Figure 4:
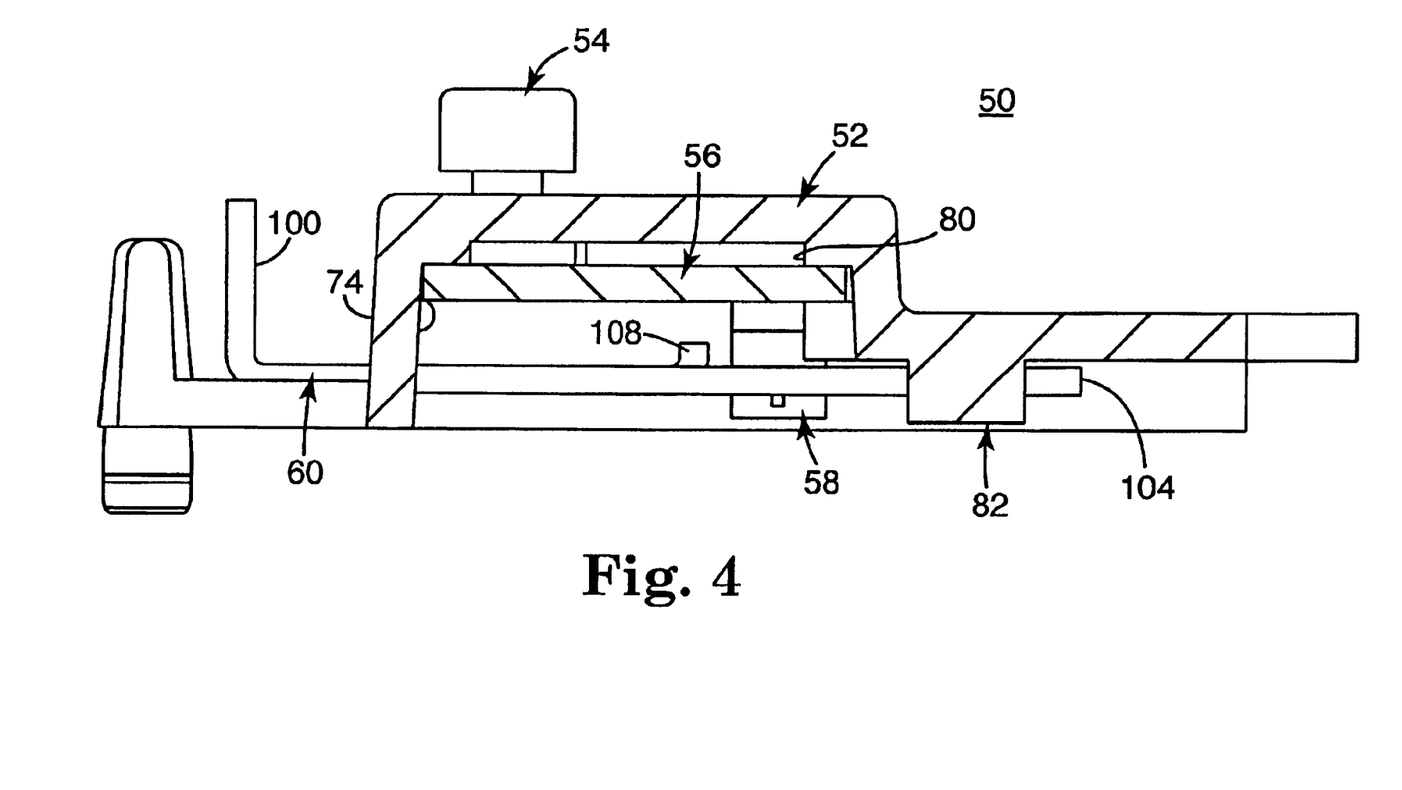
FIG. 4 is a cross-sectional view of the assembly of FIG. 3.

The construction of the assembly 50 is best shown by the cross-sectional view of FIG. 4. As a point of reference, while only one of the push buttons 54, switches 58, and latch bodies 60 are shown, it will be understood that others of these components are similarly arranged. The circuit board 56 is maintained within the cavity 80, of the housing 52, preferably by a snap fit. The push button 54 is electrically connected to the circuit board 56, passing through a respective one of the holes 78 (FIG. 3A). Similarly, the switch 58 is electrically connected to, and physically supported by, the circuit board 56 (as a point of reference, only one arm of the switch 58 is depicted in FIG. 4). The latch body 60 is slidably secured to the housing 52. More particularly, the latch body 60 is slidably secured to the housing 52 at a respective one of the passages 84 (best shown in FIG. 3A) and the retention tabs 82. In this regard, and with additional reference to FIG. 3B, each of the latch bodies 60 is operatively associated with a respective one of the switches 58. For example, in the one preferred embodiment, each latch body 60 is positioned such that an associated one of the switches 58 extends within the opening 106 formed by the latch body 60. With this configuration, each latch body 60 is linearly slidable relative to the housing 52 and the associated switch 58 (in the direction of the arrows shown in FIG. 4).

The linearly slidable feature facilitates each latch body 60 being positioned in a first, retention position (shown in FIG. 4), and a second, release position. In the retention position of FIG. 4, the leading end 100 is slid or extended away from the housing front 74 (leftwardly relative to the orientation of FIG. 4). In this retention position, the latch body 60 serves to impede PCI card removal as described in greater detail below. In addition and with the one preferred embodiment in which the switch 58 is an optical switch, the finger 108 of the latch body 60 is clear of the associated switch 58, such that the switch 58 operates in a desired first state (either "on" or "off"). Conversely, in the release position, the leading end 100 is retracted into close proximity with the housing front 74. As described below, retraction of the leading end 100 allows for PCI card removal. In addition, the finger 108 passes within the gap 92 (FIG. 3B) of the associated (and preferred) optical switch 58, causing the optical switch 58 to switch to the second state (again, either "on" or "off"). Thus, in addition to impeding or allowing PCI card removal, the latch body 60 position causes the switch 58 to operate in a desired state. This operational state, in turn, is indicative of a preferred powering condition. Requisite system operations for achieving this desired powering state are then prompted by the circuit board 56.

It will be understood that the above-described latch body 60 is but one acceptable design and that additional features may be incorporated therein. For example, the latch body 60 may be configured such that the finger 108 engages the (preferred) optical switch 58 in the retention position (as opposed to the release position). For example, the opening 106 (FIG. 2) can be alternately located and sized, with the finger 108 projecting forwardly (relative to the trailing end 104) within the opening 106. With this technique, the finger 108 will interfere with the optical switch 58 light beam in the retention state, but will cease interference in the release position. Additionally, the latch body 60 can be formed to include one or more stops that limit sliding extension of the leading end 100 (i.e., leftwardly relative to the orientation of FIG. 4). For example, a downwardly extending shoulder could be formed on the latch body 60 adjacent the trailing end 104. The shoulder would contact the retention tabs 82 in the retention position. Alternatively, other techniques are equally acceptable. Regardless, the latch body 60 is configured to slide in a linear fashion relative to the housing 52, and to cause the switch 58 to switch operational states between the retention position and the release position.

Figure 5:
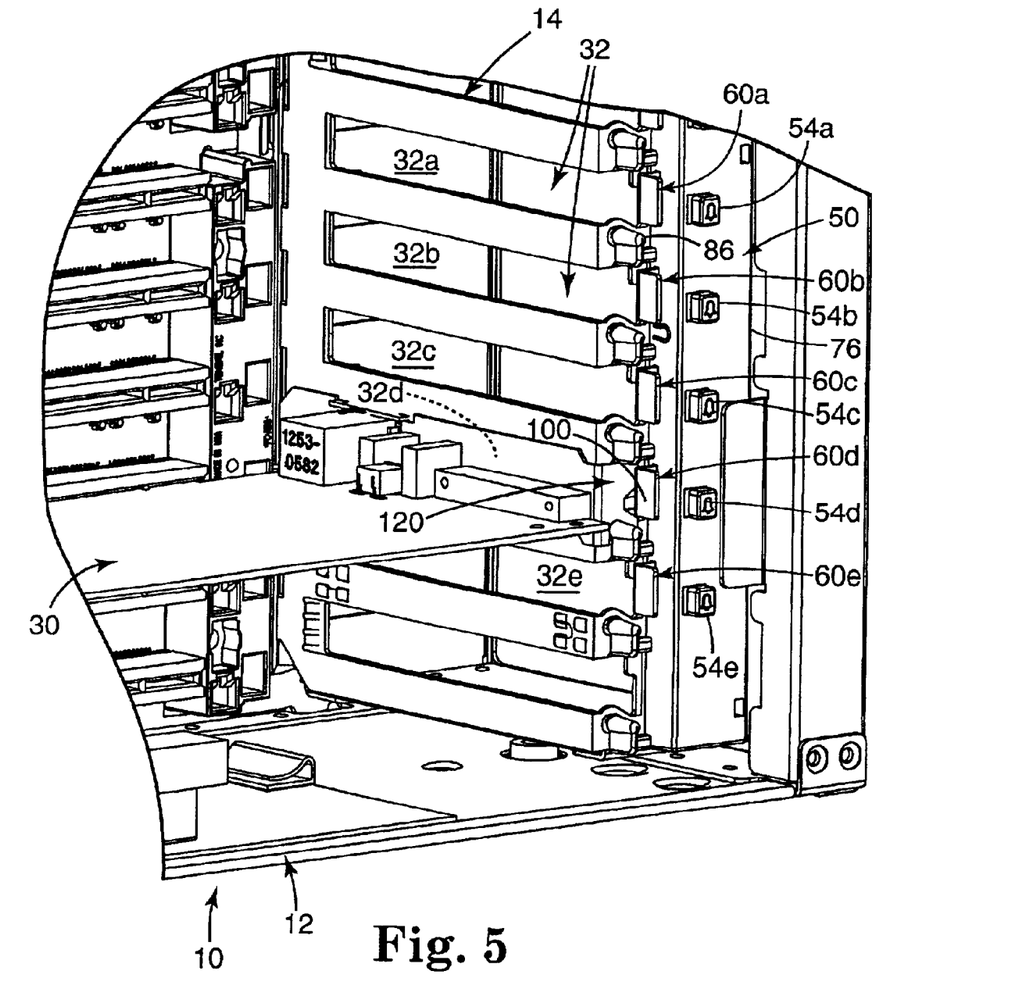
FIG. 5 is an enlarged, perspective view of a portion of the assembly of FIG. 2 mounted to a computer system.

Functioning of the assembly 50 is best described with reference to the enlarged view of FIG. 5 in which the assembly 50 is shown mounted to the card bay 14. Once again, the card bay 14 forms a plurality of slots 32. PCI cards 30 (one of which is shown in FIG. 5) are located within the slots 32. As is known, each PCI card 30 is coupled to, or is carried by, a bracket or bulkhead 120 that nests against the card bay 14 upon insertion into one of the slots 32. The actuator assembly 50 is mounted to the card bay 14 via the guide pieces 86, as well as by engagement between the back 76 (partially hidden in FIG. 5) of the housing 52 and the chassis 12. Once mounted, each of the latch bodies 60 is operatively associated with a respective one of the slots 32. For example, the latch bodies 60a–60e are operatively associated with, preferably aligned with, the slots 32a–32e. As a point of reference, the latch bodies 60a–60c and 60e are shown in the release position, whereas the latch body 60d is shown in the retention position. Further, the one PCI card 30 is inserted within the slot 32d, such that the slot 32d is effectively hidden in FIG. 5.

Upon final mounting of the assembly 50, the push buttons 54a–54e are similarly located adjacent respective ones of the slots 32a–32e. The circuit board 56 (FIG. 2) electrically associates each of the push buttons 54a–54e with respective ones of the slots 32a–32e. More particularly, circuitry connections provided by the circuit board 56 associate actuation of a particular one of the push buttons 54a–54e with a desired one of the slots 32a–32e. For example, in response to actuation of the push button 54c, the circuit board 56 prompts a powering operation to occur relative to the slot 32c. In a preferred embodiment, this powering operation is a graceful powering down of the designated slot 32.

In addition, the circuit board 56 associates each of the switches 58 (FIG. 2) with a corresponding one of the slots 32. For example, though not shown in FIG. 5, a switch 58 is associated with the latch body 60b as previously described. In the release position of FIG. 5, the latch body 60b causes the associated switch 58 to operate in a first state (e.g., with the one preferred embodiment, the latch body 60b "trips" the optical switch 58 via the corresponding finger 108 (FIG. 3B)). The circuit board 56, in turn, interprets this operational state of the switch 58 as being indicative of a power (or powering) down condition, and powers down the associated slot 32b (and maintains this power down condition for the slot 32b until otherwise prompted). When the latch body 60b is moved to the retention position, the latch body 60b causes the associated switch 58 to switch to the second state. The circuit board 56, in turn, interprets this second operational state as being indicative of a power (or powering) on condition. As a result, the circuit board 56 prompts necessary routines for effectuating powering up of the associated slot 32b and maintains this powered on condition.

Following mounting to the card bay 14, use of the actuator assembly 50 is preferably as follows. Each of the latch bodies 60 are positioned in the release position, whereby the respective leading ends 100 "clear" the associated slots 32. The PCI cards 30 (one of which is shown in FIG. 5) designed by the user and then inserted into the slots 32. Notably, not all of the slots 32 need have PCI cards inserted therein for operation of the computer system 10. Following loading of one or more of the slots 32, the latch bodies 60 associated with each of the now-loaded slots 32 are linearly slid into the retention position. As shown in FIG. 5, the latch body 60d has been slid into the retention position, whereby the leading end 100 impedes access to the slot 32d, as well removal of the PCI card 30. In particular, the leading end 100 of the latch body 60d is positioned over the bulkhead 120 otherwise coupled to the PCI card 30 so that the PCI card 30 cannot be inadvertently removed from the slot 32d. In the retention position, the latch bodies 60 (such as the latch body 60d) cause the respective, associated optical switch(es) 58 to operate in a state indicative of a powering on condition. The circuit board 56 then prompts powering on operations to occur relative to the slot(s) 32 for which the associated latch body 60 has been maneuvered to the retention position. Thus, for example, the circuit board 56 prompts powering on of the slot 32d. Following completion of the requisite powering on operation, the computer system 10 is ready for use.

From time-to-time, a user may wish to remove one or more of the PCI cards 30 for servicing, exchange, etc. Rather than shut the computer system 10 down entirely, a hot plug operation of the PCI card 30 in question can be followed. Preferably, the user actuates the push button 54 associated with the slot 32/PCI card 30 in question (with respect to the one example of FIG. 5, for example, the push button 54d is pressed). The circuit board 56 prompts a graceful powering down of the slot 32, after which a visual indication is provided that the PCI card 30 can be removed. To this end, in one preferred embodiment, the push button 54 can include an internal LED that visually signals when the graceful powering down operation is complete. Regardless, the associated latch body 60 is then maneuvered to the release position, thereby allowing removal of the PCI card 30.

It has been recognized that users may accidentally forget to depress the push button 54 prior to removing the PCI card 30. In this scenario, the user is still required to slide the respective latch body 60 to the release position in order to remove the PCI card 30. As previously described, movement of the latch body 60 from the retention position to the release position causes the associated switch 58 (FIG. 2) to switch operational states. The circuit board 56, in turn, effectuates an immediate (or "hard") power down of the associated slot 32. Though a graceful power down is more preferred, the hard power down operation greatly minimizes the opportunity for component damage as compared to the PCI card 30 being removed with the slot 32 still powered. Thus, with reference to the one example of FIG. 5, in the event the push button 54d were not depressed, the latch body 60d must still be slid to the release position in order to remove the PCI card 30. This action, in turn, causes the switch 58 otherwise associated with the latch body 60d to switch operational states as previously described. In response, the circuit board 56 prompts a hard power down of the slot 32d.

The actuator assembly of the present invention provides a marked improvement over previous designs. The actuator assembly has a low-profile configuration, yet still achieves desired hot plug functionality. The actuator assembly can readily be mounted to virtually any existing computer system, especially those having limited physical space. In this regard, the one preferred actuator assembly is configured for a snap-on mounting to an existing computer server system, thereby eliminating the need for installation tools.

Although the present invention has been described with reference to preferred embodiments, workers skilled in the art will recognize that changes can be made in form and detail without departing from the spirit and scope of the present invention. For example, the actuator assembly has been described as preferably being implemented with a specific server chassis. Alternatively, the actuator assembly is equally useful with a wide variety of other computer systems, both now in existence and as developed in the future.

What is claimed is:

1. A low profile actuator assembly for controlling card removal from a hot pluggable computer chassis bay, the assembly comprising:

a housing adapted for mounting to the bay and defining a top, bottom, and front;

a switch connected to the housing bottom and operable in a first state indicative of a power on condition and a second state indicative of a power off condition; and a latch body defining an opening and a finger projecting within the opening, the latch body connected to the housing and operably associated with the switch, the latch body being linearly slidable between a retention position and a release position, wherein:

in the retention position, the latch body is extended relative to the housing front and causes the switch to operate in the first state, and in the release position, the latch body is retracted relative to the housing front and causes the switch to operate in the second state.

2. The assembly of claim 1, wherein the assembly is adapted such that upon final mounting to the chassis bay, the latch body and the switch are operatively associated with a slot formed by the chassis bay.

3. The assembly of claim 2, further comprising:

circuitry electrically connected to the switch and capable of controlling power delivered to the slot, the circuitry configured to allow power supply to the slot when the switch is in the first state, and to cease power supply to the slot when the switch is in the second state.

4. The assembly of claim 1, further comprising:

a push button coupled to the housing adjacent the latch body, the push button assembled through an opening of the housing top and adapted to prompt a powering down condition.

5. The assembly of claim 1, wherein the housing front forms a passage sized to slidably receive the latch body.

6. The assembly of claim 1, wherein the latch body is defined by a leading end and a trailing end, and further wherein upon final assembly the leading end extends outwardly from the housing front and the trailing end is located within the housing, the assembly further comprising:

retention tabs extending from the housing bottom, the retention tabs adapted to slidably maintain the latch body opposite the housing front.

7. The assembly of claim 1, wherein the latch body includes a leading end, an intermediate portion, and a trailing end, the intermediate portion forming the opening and having the finger projecting within the opening, and further wherein upon final assembly, the switch is positioned within the opening and the finger is selectively sensed by the switch with linear sliding movement of the latch body.

8. The assembly of claim 1, wherein the latch body includes a leading end, an intermediate portion, and a trailing end, the leading end defining a handle extending in a substantially perpendicular fashion from the intermediate portion.

9. The assembly of claim 1, wherein the switch is an optical switch.

10. The assembly of claim 1, further comprising:

a plurality of switches coupled to the housing bottom; and a plurality of latch bodies slidably connected to the housing and operably associated with respective ones of the switches;

wherein upon final assembly to the chassis bay, each latch body is associated with a respective slot formed by the chassis bay.

11. An enclosure device for use with a computer system adapted for hot plug interface with PCI cards, the device comprising:

a chassis defining a height of the computer system;

an input/output card bay formed by the chassis, the bay defining a plurality of card slots;

a low profile actuator assembly for controlling card removal from the bay, the assembly comprising:

a housing mounted to the bay and defining a top, bottom, and front, a switch connected to the housing bottom, a latch body defining an opening and including a leading end, the switch positioned within the opening and the latch body slidably connected to the housing adjacent one of the card slots, the latch body being linearly slidable between a retention position in which the leading end impedes access to the slot and causes the switch to operate in a first state, and a release position in which the leading end is clear of the slot and causes the switch to operate in a second state.

12. The device of claim 11, further comprising:

a push button coupled to the housing adjacent the latch body, the push button being assembled through an opening in the housing top and adapted to prompt a graceful shut down of power supplied to the slot.

13. The device of claim 11, wherein the housing front forms a passage sized to slidably receive the latch body.

14. The device of claim 13, wherein the slot is adapted to selectively receive a PCI card carrying a bulkhead having a shoulder portion sized to rest against an outer frame of the card bay, and further wherein a spacing between the housing bottom and the slot at the housing front approximates a thickness of the bulkhead shoulder portion.

15. The device of claim 11, wherein the chassis has a height of 7U.

16. The device of claim 11, wherein the chassis is configured to receive a side panel opposite the card bay for selectively enclosing the card bay, the chassis defining a spacing of approximately 0.5 inch between the card bay and the side panel, and further wherein the assembly is adapted to define a maximum height of less than 0.5 inch.

17. The device of claim 11, wherein the switch is an optical switch.

18. The device of claim 11, further comprising:

a plurality of switches coupled to the housing bottom; and a plurality of latch bodies slidably connected to the housing and operably associated with respective ones of the switches;

wherein upon final assembly to the chassis bay, each latch body is associated with a respective slot formed by the chassis bay.

19. The device of claim 11, further comprising:

circuitry electrically connected to the optical switch and adapted to control power delivered to the slot, the circuitry adapted to prompt power supply to the slot when the optical switch is in the first state and to cease power supply to the slot when the optical switch is in the second state.

20. An improved PCI locator assembly for use with a computer system having hot plugging capabilities and a chassis including a card bay defining a plurality of slots, the PCI locator assembly including a housing adapted for mounting to the chassis and guide pieces extending from the housing for directing PCI cards into the sots, the improvement comprising:

a plurality of switches coupled to a bottom of the housing, each of the switches being operatively associated with a respective one of the slots; and a plurality of latch bodies each operatively associated with a respective one of the switches and corresponding ones of the slots, at least one latch body defining an opening and one of the switches projecting within the opening, each of the latch bodies being linearly slidable relative to the housing and the respective switch such that in a first position, each latch body impedes removal of a card from a respective slot and causes the switch to operate in a first state, and in a second position, each latch body is clear of the respective slot and causes the respective switch to operate in a second state.

21. The assembly of claim 1, wherein the housing covers the switch.

* * * * *